(No Model.) 6 Sheets—Sheet 1.

C. N. DUTTON.
FLUID METER.

No. 394,562. Patented Dec. 18, 1888.

Witnesses:
James Young.
L. B. Wright.

Inventor,
Chauncey N. Dutton
By his Attorneys, Baldwin, Hopkins & Peyton (No Model.) 6 Sheets—Sheet 2.
C. N. DUTTON.
FLUID METER.
No. 394,562. Patented Dec. 18, 1888.
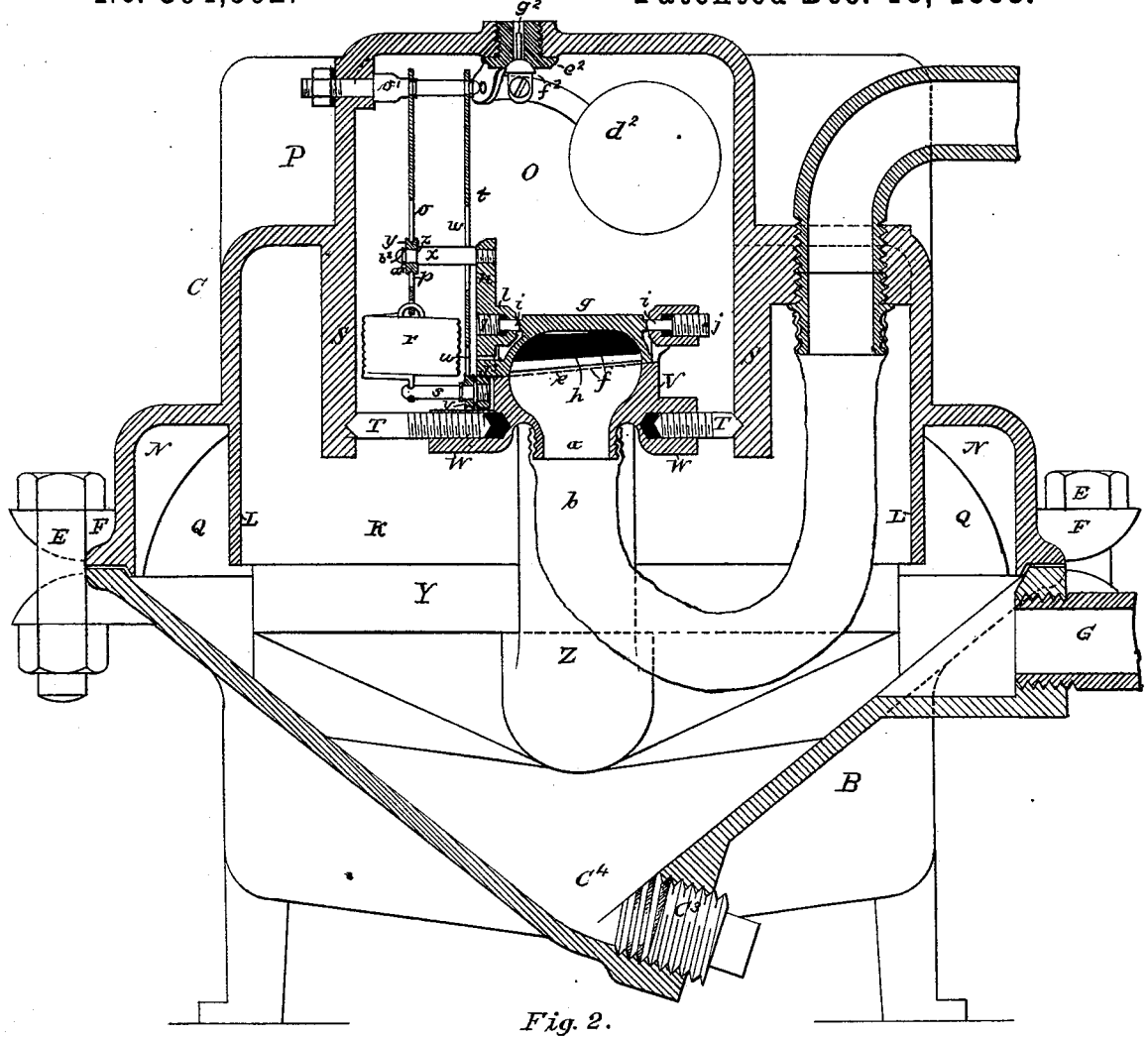
Fig. 2.
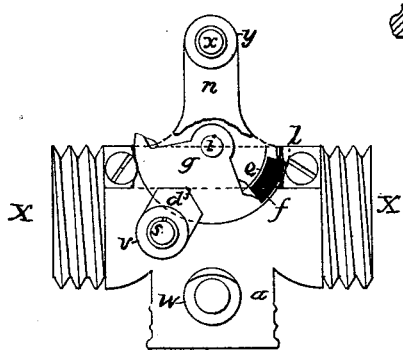
Fig. 4.
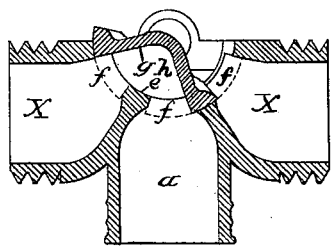
Fig. 5.
Witnesses
James Young.
L. B. Wright
Inventor,
Chauncey N. Dutton.
By his Attorneys, Baldwin, Hopkins, & Peyton.

(No Model.)  6 Sheets—Sheet 3.

C. N. DUTTON.
FLUID METER.

No. 394,562.  Patented Dec. 18, 1888.

Witnesses.  Inventor,
James Young.  Chauncey N. Dutton
L. B. Wight.
By his Attorneys, Baldwin, Hopkins, & Peyton (No Model.) 6 Sheets—Sheet 4.

C. N. DUTTON.
FLUID METER.

No. 394,562. Patented Dec. 18, 1888.

Witnesses
James Young
L. B. Wright

Inventor,
Chauncey N. Dutton.
By his Attorneys Baldwin, Hopkins, & Peyton.

(No Model.) 6 Sheets—Sheet 5.

C. N. DUTTON.
FLUID METER.

No. 394,562. Patented Dec. 18, 1888.

Witnesses.
James Young
L. B. Wright

Inventor,
Chauncey N. Dutton.
By his Attorneys, Baldwin, Hopkins & Peyton.

N. PETERS, Photo-Lithographer, Washington, D. C.

(No Model.) 6 Sheets—Sheet 6.

C. N. DUTTON.
FLUID METER.

No. 394,562. Patented Dec. 18, 1888.

Witnesses.
James Young.
L. B. Wright.

Inventor,
Chauncey N. Dutton.
By his Attorneys,
Baldwin, Hopkins, & Peyton.

UNITED STATES PATENT OFFICE.

CHAUNCEY N. DUTTON, OF CAMDEN, NEW JERSEY, ASSIGNOR TO THE FUEL GAS AND ELECTRIC ENGINEERING COMPANY, (LIMITED,) OF PITTSBURG, PENNSYLVANIA.

FLUID-METER.

SPECIFICATION forming part of Letters Patent No. 394,562, dated December 18, 1888.

Application filed October 7, 1884. Renewed March 8, 1887. Serial No. 230,167. (No model.)

*To all whom it may concern:*

Be it known that I, CHAUNCEY N. DUTTON, of Camden, Camden county, New Jersey, have invented certain new and useful Improvements in Fluid-Meters, of which the following is a specification, reference being had to the accompanying drawings.

The objects of my invention are to provide a simple, economical, accurate, reliable, and durable meter for measuring water and other fluids which shall be free from the defects of ordinary meters, which shall work perfectly under very slight pressure or "head," which shall be without extensive rubbing or wearing surfaces and subject to only minimum friction, which shall not be liable to injury or obstruction from sediment, which may be conveniently accessible for repairs, which may be easily set at any point on the supply, and which will not be injured by freezing its contained liquid.

Figure 1:
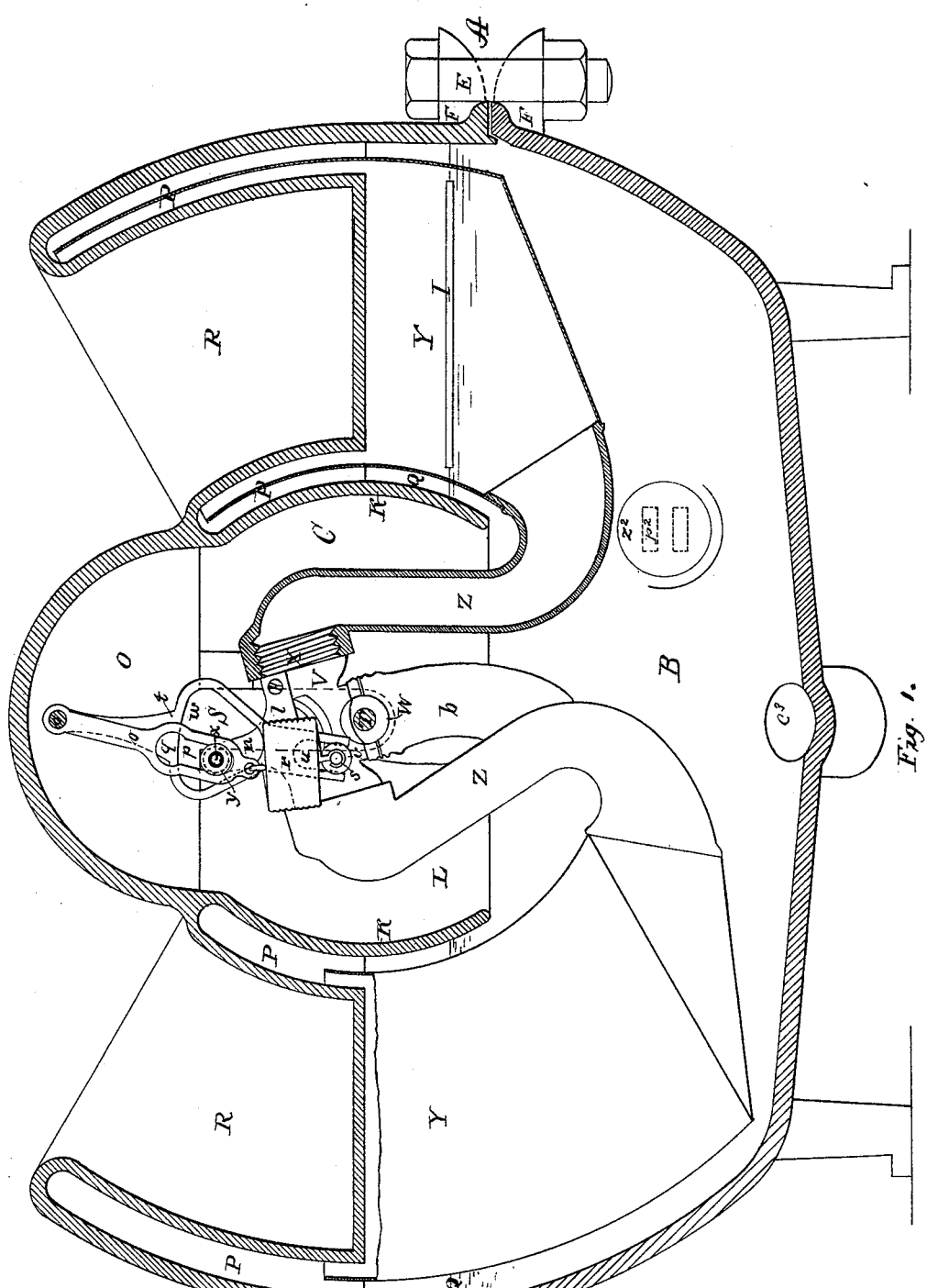
Figure 3:
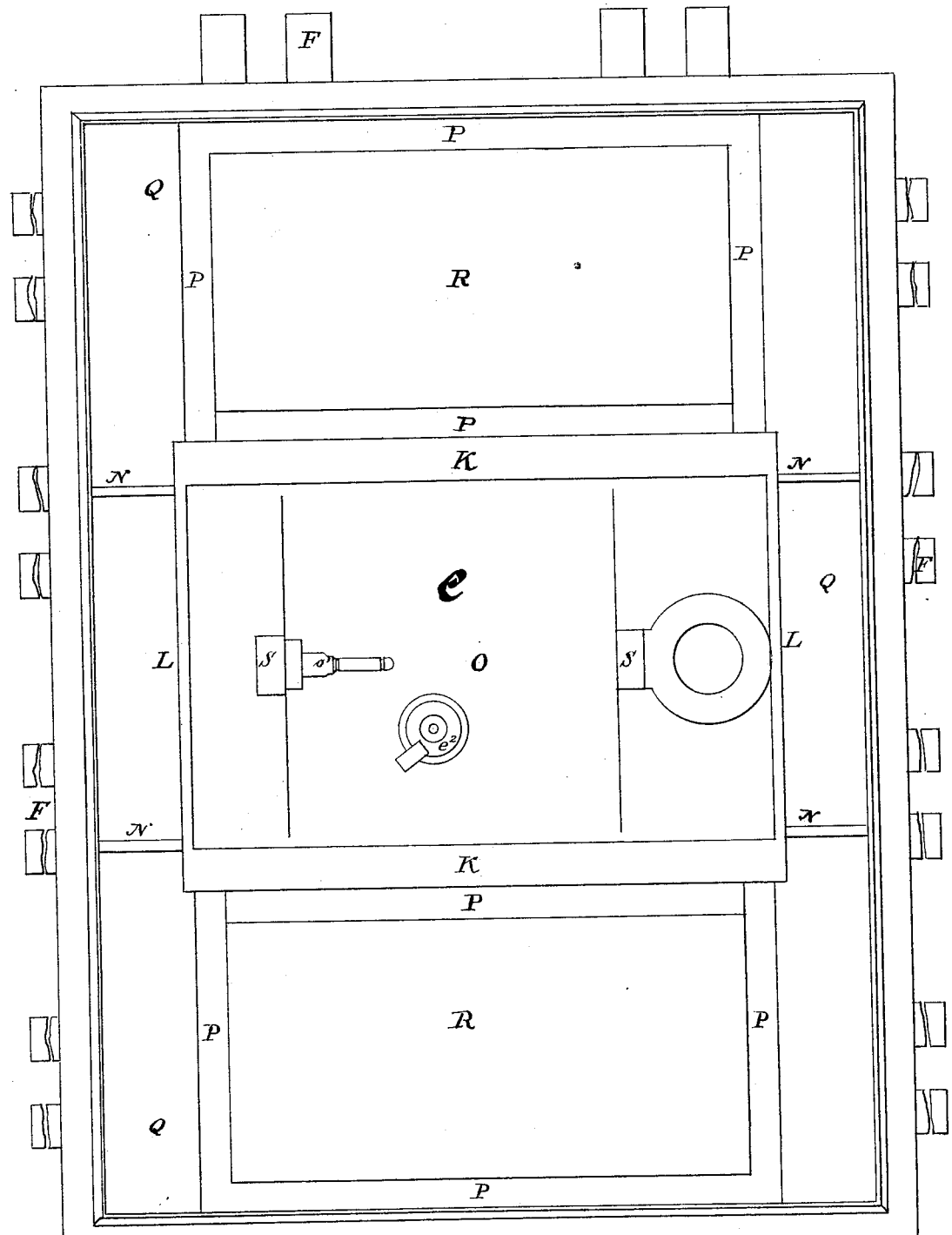
Figure 7:
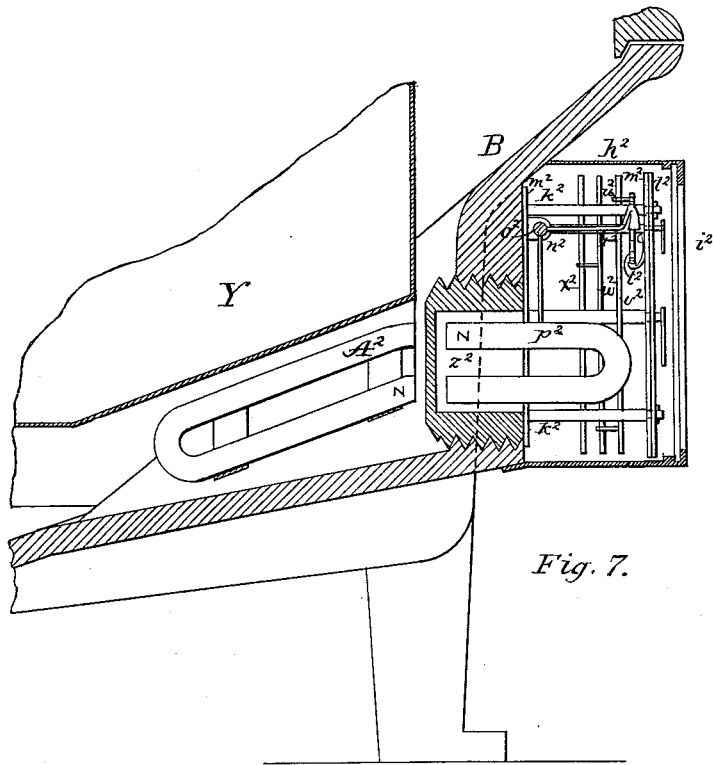
Figure 8:
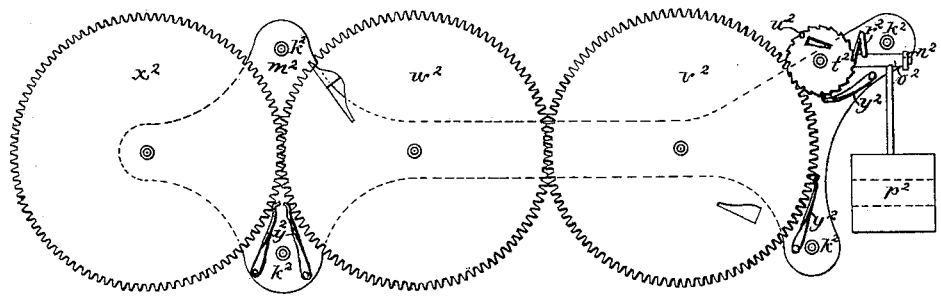
Figure 9:
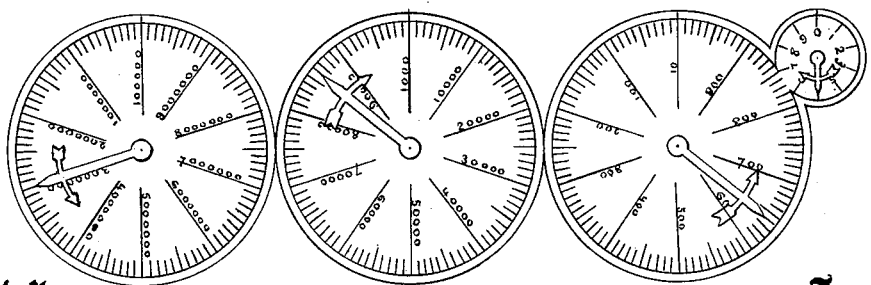

In the accompanying drawings, Figure 1 is a longitudinal section on a line slightly off the center, showing the cups in section and valve mechanism in elevation. Fig. 2 is a transverse central section. Fig. 3 is a plan looking up into the upper half. Fig. 4 is a front view of the valve detached. Fig. 5 is a longitudinal vertical section through the center of the valve. Fig. 6 is a section showing guide-shoulder on yoke to facilitate its setting. Figs. 7, 8, and 9 are views of the details of the registering mechanism detached.

Speaking in general terms, my meter, as illustrated in Figs. 1 to 9, inclusive, consists of a case with two air-chambers in its upper part and containing a centrally-pivoted oscillating measuring mechanism composed of a valve and controlling devices and two measuring-cups connected with the valve, one on either side, which oscillate into the air-chambers, forcing the water out against the contained air, while a suitable mechanism registers the oscillations and indicates the quantity of fluid passing through the meter.

Referring to the letters upon the drawings and proceeding to describe my improved meter in detail, A is a case cast in two parts, B being its lower and C its upper half. These two parts of the case may be fitted and secured together in any suitable way by means of bolts E, passing through coincident projecting lugs F, cast upon the parts to be joined or otherwise, and the joint should be packed water-tight by means of elastic cement or the like. The upper part, C, is divided into three parts by the partitions K and L.

N are strengthening-bridges.

In Figs. 1 and 2, O is a central dome, and P P are air-chambers, which are preferably annular in horizontal section.

Q Q are expansion-chambers or air-reservoirs of comparatively large dimensions, into which the air-chambers open downwardly.

R R are rectangular walls extending downwardly from the crown of the meter into the air-chambers P and forming fluid-displacers to diminish the volume of fluid contained therein. These displacers are preferably cast solid with the part C.

The oscillating measuring mechanism is pivoted centrally and balanced within the meter. This consists, as already stated, of a central valve with suitable controlling mechanism and connected through tubes with two measuring-cups, which oscillate in and out or nearly out of the air-chambers P.

S S are ears depending from the upper part, C, of the case for sustaining the measuring mechanism, and T T are conical pivotal screws on which it oscillates.

V is a central valve-shell, and W W screw-stumps for the pivot-screws T.

X X are screw-stumps on the sides of the valve-shell.

Y Y are measuring-cups oscillating into the air-chambers, and Z Z are tubes connecting them with the valve by means of the screw-stumps X X.

*a* is a central ribbed stump on the bottom of the valve-shell, and *b* a flexible eduction-pipe connected with the stump *a* and an outlet through the side of the case.

G is the inlet-pipe. The measuring-cups Y are preferably rectangular in horizontal section and formed in a sweep corresponding with their arc of oscillation, and their top and bottom planes incline in lines nearly radial from the point of oscillation. The rim of each measuring-cup is always in its corresponding air-chamber, P, and at the uppermost point of oscillation the measuring-cups surround the cups R.

I are floats of varnished wood, slightly smaller than the cups Y, to prevent formation of eddies and sucking out of the air in the air-chambers. A thin film or body of oil may be deposited upon the surface of the water with similar results. In order to assist in obtaining these results, I form the bottom of the cup in a concave shape or gradually reduced to the tube Z, as shown. In the central valve, $e$, is a valve-seat, in shape a section of a hollow cone.

$f$ are three equal radial ports symmetrically disposed, the side ports connecting each with its corresponding cup, Y, through a stump, X, and tube Z, and the lower or central port communicating with the eduction-pipe through the stump $a$.

In order to regulate the flow of water to and from the measuring-cups, I provide a valve, $g$, corresponding with the valve-seat, and having in its face a central radial recess, $h$, corresponding with two of the ports $f$ and the intervening space. From this construction it is evident that when the valve is turned to one side the measuring-cup on that side and the eduction-pipe will be connected through the corresponding side and the lower ports and the recess $h$, and the water in said cup will leave the meter, while the opposite side port will be open, permitting the water which enters the meter-body through the inlet-pipe G to flow freely into the corresponding measuring-cup, so causing the measuring mechanism to oscillate by differential pressure. In order to prevent the valve turning too far, I provide a buffer, $d^3$, on the valve, which strikes against the yokes $l$, as indicated by dotted lines in Fig. 4.

$i\ i$ are trunnions on which the valve $g$ oscillates, and $j\ j$ set-screws for adjusting the valve to its seat. One of these screws $j$ passes through the valve-shell, and the other through a yoke, $l$, extending across the face of the valve-shell and secured thereto.

$m\ m$ are guides or shoulders corresponding with the valve-seat to facilitate setting the yoke.

$n$ is a standard rising from the yoke or valve, which actuates a mechanism controlling the valve $g$. In such mechanism $o$ is a slotted lever or pendulum pivoted at a point above the valve, preferably on an arm, $o'$.

$p$ is a slot with beveled edges enlarged at $q$, as shown.

$r$ is a spiral spring loosely connected with the pendulum and with a stud, $s$, on the center line of the valve $g$, projecting from the buffer $d^3$. A second pendulum or lever, $t$, is pivoted in the same line with pendulum $o$ and has a bottom slot, $u$, also with beveled sides.

$v$ is a grooved wheel on the stud $s$ and travels in the slot $u$.

$w$ is a comparatively wide slot in the upper part of $t$.

$x$ is a stud on the rigid standard $n$.

$y$ is a grooved roller on the stud $x$ and plays in the slot $p$ in the pendulum $o$, being entered through the enlarged portion $q$. The stud $x$ plays through the wide slot $w$ in the pendulum $t$. The beveled edges of the slots $u$ and $p$ lie in the grooves in the corresponding wheels, and the pendulums are confined thereby in certain planes.

In order to secure the wheel $y$ on the stud $x$, I shoulder the latter at $z$ and turn an annular groove, $a^2$, in proper relation thereto. The wheel being slipped on, a cut spring ring or clip, $b^2$, is sprung into the groove $a^2$, securing the wheel. The wheel $y$ is similarly secured on the stud $s$. The spring $r$ is loosely secured to the pendulum $o$ and stud $s$ by hooks, as shown.

Having thus described my measuring mechanism as illustrated in Figs 1 and 2, I shall now explain its operation.

The valve $g$ has no neutral position, but must always connect one or other of the measuring-cups with the eduction-pipe; hence when water is drawn the cups will always oscillate. At such times the upright $n$ and stud $x$ deflect the pendulum $o$ to one side, tightening the spring $r$, which is always in tension, holding the valve securely in whichever of its two positions it may happen to be. As the pendulum $o$ nearly approaches its amplitude, the spring is drawn to its full tension, (and its tension-line is nearly coincident with the central line of the valve,) but cannot tend to move the valve until assisted by the pendulum $t$. At the proper time this pendulum is moved by contact of the stud $x$ with the side of the slot $w$, moving the valve $g$ from its position, so that the draft of the spring $r$ passes to the other side of the center of the valve and draws it quickly into reverse position. The valve parts are so proportioned that this motion is accomplished without the slightest jar or stoppage of flow, as the valve in reversing, before it entirely cuts off flow from one cup, admits it from the other, thus cushioning the action. The cup just emptied now begins to fill and the filled one to empty, and the oscillatory motion is reversed. It is evident that the quantity of water displaced at each one-half stroke of the meter is equal to the area of one of its cups multiplied by the mean arc of stroke, and is independent of the water-level in the air-chambers, which will vary with varying pressures. In order to accommodate this variation, I have provided the expansion-chambers Q. When too much air accumulates in the air-chambers, it will escape under the diaphragms K and L into the central dome, O. I may provide for the escape of surplus air from O in several ways. The simplest is (when possible) to let the servicepipe fall from the street-main to the meter and introduce the supply through the crown of the dome, so that surplus air will escape by backing out through the supply-pipe. This is seldom practicable, however; so I provide another means, in which $d^2$ is a ball-valve and lever, and $e^2$ a spherical valve-seat and escape-tube screwed into the crown of the dome. $f^2$ is a corresponding valve loosely secured to the lever and provided with a guide, $g^2$, playing in the escape. When too much air accumulates, the ball falls with the displaced water and the valve is opened, allowing the surplus air to escape.

In order to register the oscillations of the measuring mechanism, I provide suitable registering apparatus, preferably as hereinafter described. It is attached to the side of the meter and suitably inclosed. In such organization $h^2$ is such an inclosure, and $i^2$ a glazed opening therein. $k^2$ are posts, and $l^2$ a dial-plate, and $m^2$ bed-plates for pinion-bearings. The plates are secured to and sustained by the posts $k^2$. $n^2$ are standards, and $o^2$ a rock-shaft pivoted therein. $p^2$ is a magnet attached to the rock-shaft; $r^2$, a pawl for moving the initial or ratchet wheel, $t^2$, of the series, which has sufficient cogs upon it so that one revolution registers ten units. On its pitch-line is a single pin, $u^2$, which gears with the second wheel, $v^2$, once per revolution. The wheel $v^2$ has one hundred peripheral teeth and one pin, (see Fig. 7,) which gears once per revolution into a third wheel, $w^2$, similarly constructed and similarly related with a fourth wheel, $x^2$. $y^2$ are spring-stops for retaining the wheels and preventing undue motion.

Opposite the magnet $p^2$ in the wall of the meter a diamagnetic (brass) plate, $z^2$ is screwed. Upon the measuring-cup Y a magnet, $A^2$, is secured, which at the lowermost part of the oscillation comes immediately opposite the diamagnetic plate and magnet $p^2$. The magnets are so disposed that their opposite poles are at such time immediately adjacent, and hence in position to attract, and at no other time. Therefore each time the measuring mechanism makes one complete oscillation the magnet $A^2$ on the cup returns once to its polar position with reference to the magnet $p^2$, attracting it to the plate and engaging the pawl with a fresh tooth. As $A^2$ retires it changes its polarity, and the repulsion of similar poles and gravity of the magnet carry the rock-shaft and its belongings back to the first position, the pawl moving initial wheel, $t^2$, one cog. As consequence of the design of the registering mechanism—

| | | | | |
|---|---|---|---|---|
| 1 revolution of $t^2$ marks | | | 10 units, (gallons.) | |
| 100 rev. $t^2$, 1 | " | " $v^2$ " | 1,000 | " |
| 100 " $v^2$, 1 | " | " $w^2$ " | 100,000 | " |
| 100 " $w^2$, 1 | " | " $x^2$ " | 10,000,000 | " |

$C^3$ is a tap-hole with a screw-plug in the lower part of the meter for removing sediment from the collecting-receptacle $C^4$ in the bottom of the case.

Heretofore in water-meters a point of great weakness has been that sediment, &c., entering the meter must needs pass through it to the great detriment of the working parts.

It is evident that in my meter the entering water is so retarded before reaching the cups Y as to precipitate a great part of its suspended matter. My meter will also act as an eel-trap. Other advantages of this meter are—

First, almost total elimination of friction.

Second, absence of any necessity for extreme care in adjusting its parts.

Third, extreme simplicity and small working-surface of valve.

Fourth, absence of other wearing-surface.

Fifth, impossibility of measuring air for water.

Sixth, as the friction is so small, it will run with about one-tenth of an ounce pressure, which pressure has a working force of about twenty-four ounces; hence it requires only a fraction of an inch of head.

Seventh, positive movement of all parts.

Eighth, absence of any communication or outlet through walls except for inlet and eduction pipes and air-escape.

Ninth, absence of glands, revolving journals, and all packing-boxes.

Tenth, my meter may freeze without injury, because of the shape and relation of the parts with which the liquid contacts.

Eleventh, it may be set at any point on the supply, and requires neither man-hole nor cover.

It will be observed that no part of the meter mechanism is attached to the lower half of the meter; hence if the meter gets out of order the upper half can be readily removed without disturbing the mechanism and the meter repaired.

Figure 12:
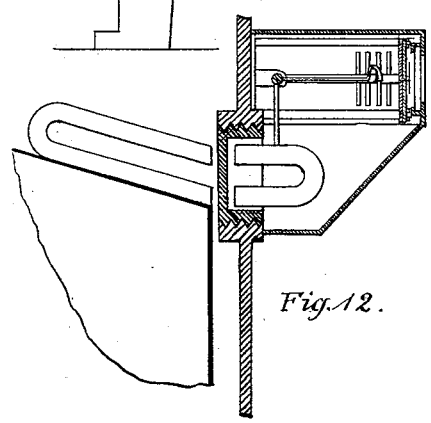
Figure 13:
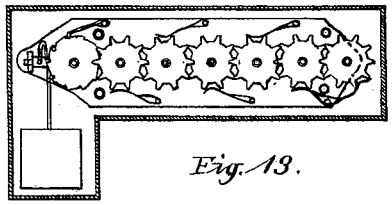
Figure 14:

It is evident that for the air in chambers P in first-described form any non-volatile fluid lighter than and insoluble in water may be substituted without detriment. It is also evident that by reversing the order of the parts (turning the meter upside down) and substituting some non-volatile fluid for the air in the cups the meter will measure steam or gases accurately; or substituting mercury or some fluid heavier than and non-soluble in water this forms answers perfectly for a water-meter. Such an arrangement is shown in Figs. 10 and 11, Fig. 10 being a longitudinal vertical section, Fig. 11 being a transverse section, and Figs. 12, 13, and 14 being details of recording mechanism similar to that already described.

Figure 10:
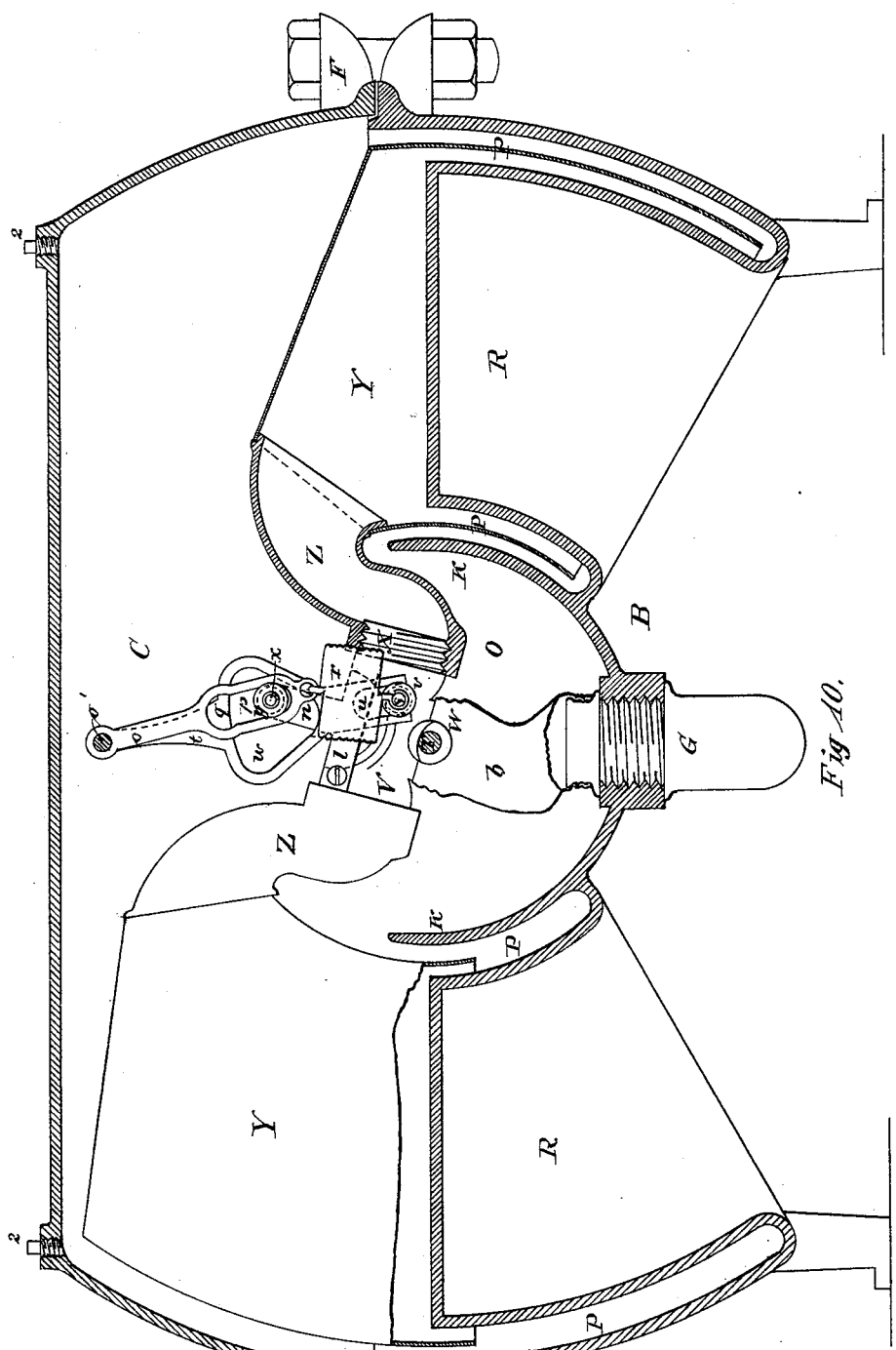
Figure 11:
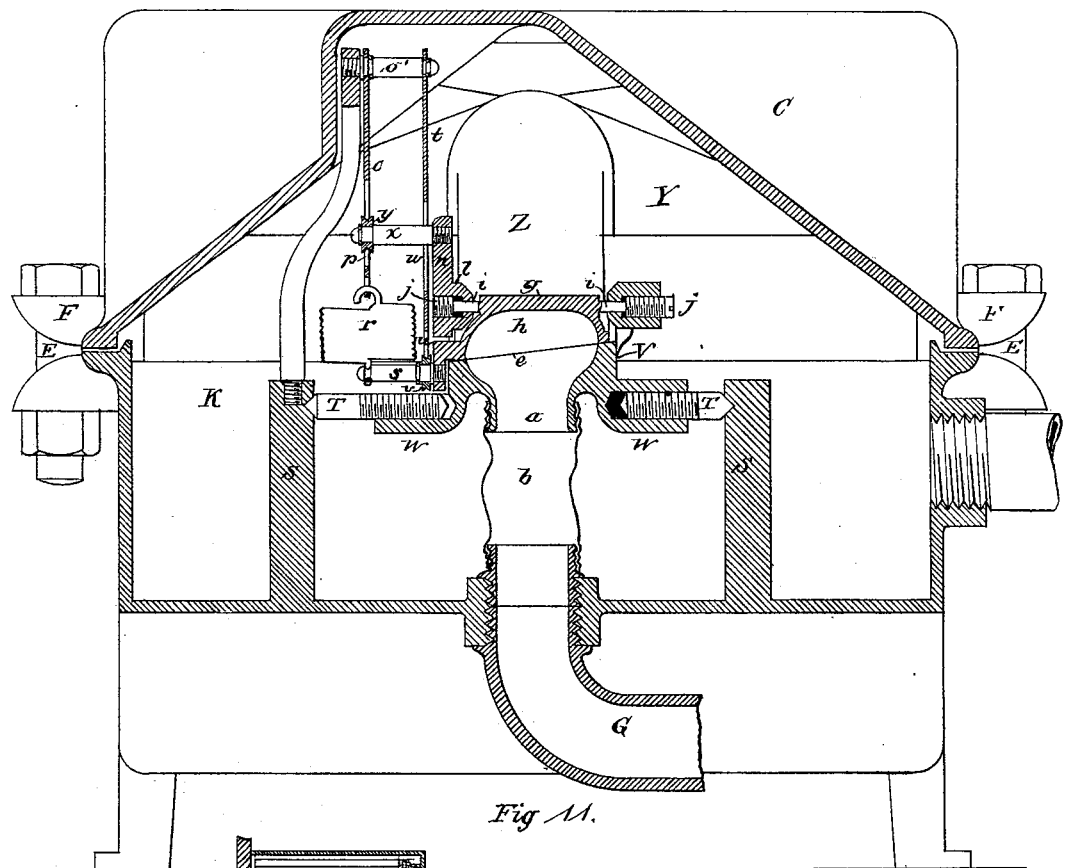

By referring to Figs. 10 and 11 it will be seen that the oscillating mechanism is supported on the lower instead of the upper part of the case, that the inlet and outlet pipes are both connected with the lower part, and that the cups are reversed. I provide in this form plugs 2 in the case for pouring in the liquid that fills the chambers P P, which, for example, in a gas-meter would preferably be glycerine and for a steam-meter the water of condensation. In this form of meter, instead of the fluid to be measured entering the body of the meter and thence passing through the valve, &c., it enters from the inlet-pipe directly through the valve into the measuring-cups alternately, and thence through the open port of the valve into the body of the meter, whence it will be taken by the distributing-pipes in the usual manner. The advantage of connecting the inlet-pipe directly with the valve is in case of steam or gas meters that a more equable flow will be obtained.

Thus it will be seen that my invention with slight modifications becomes a universal fluid-meter, measuring either liquids or gases by the displacement of the contents of the oscillating measuring-cups against a fluid of different specific gravity from and insoluble in the fluid to be measured.

Having thus described the construction, operation, and advantages of my improved meter, what I claim to be new, and desire to secure by Letters Patent of the United States, is—

1. An improved meter-case provided with fluid-chambers each having a displacer which projects into and completely closes one end of the chamber, thereby reducing the volume of the chamber and preventing the escape of fluid therefrom, substantially as set forth.

2. An improved meter-case provided with fluid-chambers and lateral expansion-chambers separated by partitions from the fluid-chambers and communicating with the latter below the partition, substantially as set forth.

3. An improved meter-case provided with fluid-chambers each having a displacer which projects into and completely closes one end of the chamber and lateral expansion-chambers separated by partitions from the fluid-chambers and communicating with the latter below the partitions, substantially as set forth.

4. An improved meter-case provided with a central dome adapted for the reception of a measuring mechanism, a pair of annular fluid-chambers located on opposite sides of the dome and separated by partitions therefrom, and a pair of displacers each of which projects into and completely closes one end of a fluid-chamber, substantially as set forth.

5. In a fluid-meter, the combination of a pair of annular segmental chambers closed at one end and adapted to contain a fluid of different specific gravity from the fluids to be measured, and a pair of oscillating segmental measuring-cups working in said chambers, substantially as set forth.

6. In a fluid-meter, the combination of a case, measuring-cups journaled to oscillate therein, and a valve controlling the passage of fluid between the measuring-cups and the case, said valve being connected to and oscillating with the measuring-cups, substantially as set forth.

7. An improved meter consisting of a suitable case having an inlet-pipe and containing a centrally pivoted or balanced oscillating measuring mechanism, combined with a flexible eduction-pipe, substantially as set forth.

8. The combination, with the valve mechanism, of the flexible eduction-pipe, the oscillating measuring-cups, and the pipes connecting said cups with the valve-shell, substantially as set forth.

9. The combination, with the valve-shell and valve, of the pendulums or levers $o$ and $t$, suitably suspended, the standard $n$, stud $x$, and spring $r$, substantially as set forth.

In testimony whereof I have hereunto subscribed my name.

CHAUNCEY N. DUTTON.

Witnesses:
MARCUS S. HOPKINS,
H. A. HALL.